United States Patent [19]

Newberg et al.

[11] Patent Number: 5,400,162

[45] Date of Patent: Mar. 21, 1995

[54] OPTOELECTRONIC MULTIBIT BEAMSTEERING SWITCHING APPARATUS

[75] Inventors: Irwin L. Newberg, Northridge; Richard C. Lind, Woodland Hills; Gregory L. Tangonan, Oxnard; Huan W. Yen, Westlake Village; Willie W. Ng, Agoura Hills; Jar J. Lee, Irvine; Andrew A. Walston, Los Angeles; Michael Wechsberg, Santa Ana, all of Calif.

[73] Assignee: Hughes Aircraft Company, Los Angeles, Calif.

[21] Appl. No.: 145,949

[22] Filed: Oct. 29, 1993

[51] Int. Cl.[6] .......................... H04J 14/0; G02B 6/28
[52] U.S. Cl. ................................ 359/117; 359/128; 359/140; 385/24
[58] Field of Search ........ 359/117, 127, 128, 139–140, 359/164, 168; 385/16–17, 24; 250/227.12, 551

[56] References Cited

U.S. PATENT DOCUMENTS

| | | | |
|---|---|---|---|
| 4,953,155 | 8/1990 | Tangonan et al. | 359/117 |
| 5,109,449 | 4/1992 | Newberg et al. | 385/24 |
| 5,241,409 | 8/1993 | Hill et al. | 359/117 |

*Primary Examiner*—Herbert Goldstein
*Assistant Examiner*—Kinfe-Michael Negash
*Attorney, Agent, or Firm*—L. A. Alkov; W. K. Denson-Low

[57] ABSTRACT

Optoelectronic switching apparatus employing optoelectronic switching devices interconnected by optical media having different delay lengths and an multiport optical coupler. The optoelectronic switching apparatus provides for a multibit true-time-delay beamsteerer for beamsteering phased array antennas. The present invention combines two types of optoelectronic devices, lasers and photodiode switches, using an interconnected passive optical network comprising the optical fibers and the optical coupler. The switches, and input and output signal networks coupled to the respective switches, are controlled using a control signal generator. Using this scheme, any input can be independently selected and a signal can be routed to any output. Furthermore, the product of the total number of different interconnect paths (N×M) is provided which provides a greater number of delay lengths than is provided by using only one type of switch (i.e. laser (N) or photodiode (M)) alone. The present invention also provides for improved insertion loss while increasing the number of delay paths.

16 Claims, 1 Drawing Sheet

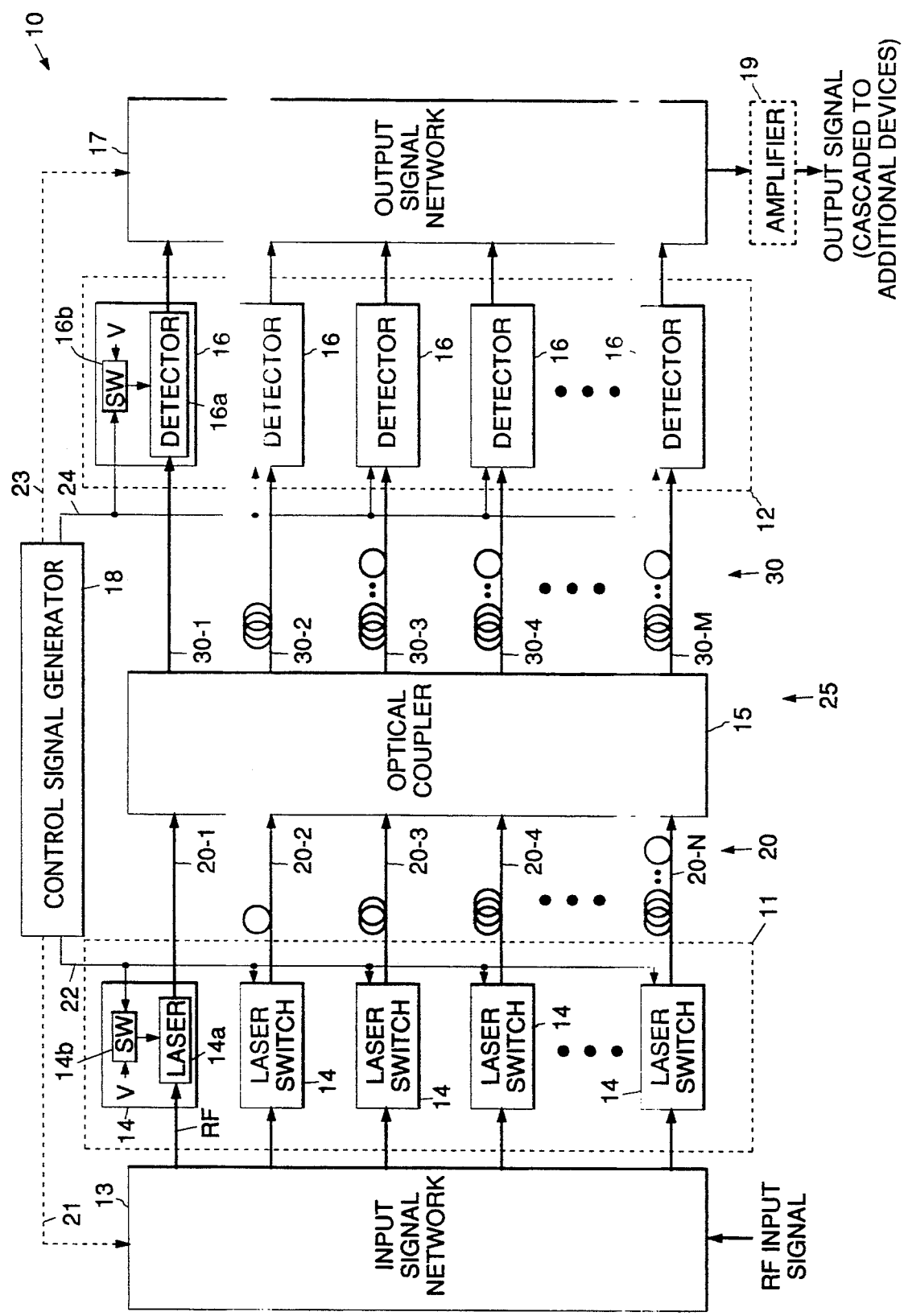

OPTOELECTRONIC MULTIBIT BEAMSTEERING SWITCHING APPARATUS

BACKGROUND

The present invention relates generally to optoelectronic switching apparatus, and more particularly, to an optoelectronic multibit switching apparatus that may be used in beamsteering applications.

The present invention provides an improvement of an optoelectronic switch designed for beamsteering applications that is disclosed in U.S. Pat. No. 5,109,449, assigned to the assignee of the present invention. This patent discloses a variable optical delay line that is employed with a laser transmitter, an optoelectronic switch, and an analog variable delay line to provide a controllable delay path for applied RF energy transmitted or received by an active array of antenna elements. The variable optical delay line comprises a input optical fiber that transmits an RF modulated optical signal to a plurality of output optical fibers. Each output fiber has a different length that determines the propagation delay of the modulated optical signal therethrough. The optoelectronic switch is responsive to the optical energy provided by a selected one of the second fibers. The switch detects the delayed optical energy and couples it to the analog variable delay line, and thereafter to a selected antenna element of the array, for example.

The optoelectronic switch of U.S. Pat. No. 5,109,449 has greater loss and/or greater complexity than is desirable for some applications because it uses only one type of switching apparatus; either laser switches or photodiode detector switches. For true-time-delay beamsteering, this requires a larger number of cascaded stages than is desirable for some applications to achieve a given number of delays.

The need for reconfigurable high speed circuits and in true-time-delay beam-steering for active arrays is recognized for both military and commercial applications. The use of fiber optics for many types of applications is expected to increase in the future. Thus, as the use of fiber optics increases, the need for circuits that can optimally reconfigure electronic circuits and provide usable delays for beamsteering will also increase. The present invention is designed to meet these needs.

Therefore, it is an objective of the present invention to provide an improved optoelectronic switching apparatus. It is another objective of the present invention to provide an improved optoelectronic switching apparatus that may be used for multibit beamsteering applications. It is a further objective of the present invention to provide an optoelectronic switching apparatus that provides a relatively large number of interconnects while maintaining a relatively low insertion loss when compared with conventional devices.

SUMMARY OF THE INVENTION

In order to meet the above objectives, present invention comprises optoelectronic switching apparatus that is adapted for use in multibit beamsteering applications. The optoelectronic switching apparatus is comprised of an input signal network, a laser transmitter section, a light receiver section, an interconnected passive optical network comprising an optical coupler and a plurality of input and output optical coupling means that interconnects the transmitter section and the receiver section, an output signal network, and a control signal generator.

The input signal network is adapted to process or distribute an applied input signal, such as a radio frequency (RF) signal, for example, such that the input signal is coupled from the signal input to signal inputs of the transmitter section. The transmitter section is comprised of a plurality of laser switches that each include a laser having an RF signal input coupled to a selected signal output of the input signal network, and a control switch coupled to the laser that has a control signal input that is coupled to the control signal generator. The control switch is also coupled between a first bias voltage source and the laser. The RF input signal input to the switching apparatus is processed by the input signal network and is distributed from the respective signal outputs thereof to respective RF signal inputs of the plurality of laser switches.

The light receiver section comprises a plurality of photodiode switches that are generally arranged in a manner similar to the laser switches. Each photodiode switch comprises a photodiode detector having a signal input and a signal output, and a control switch having a control signal input coupled between the control signal generator and the photodiode detector. The control switch is also coupled between a second bias voltage source and the photodiode detector. Switch control signals are coupled between the control signal generator and the respective control switches of the light receiver section. The output signal network is coupled to the light receiver section and is adapted to selectively couple the radio frequency (RF) signals from a selected photodetector switch to its signal output.

The interconnected passive optical network is coupled between the transmitter section and the receiver section and is comprised of and optical coupler and a plurality of input and output optical fibers. Each input optical fiber has a length that provides for a predetermined optical delay or delay length. More specifically, a first input optical fiber has a delay length of $N_1$, a second input fiber has a delay length of $N_2$, and so on for "$N_N$" such input optical fibers. This provides for "N" selectable delays. Each respective output optical fiber also has a predetermined delay length. A first output optical fiber has a delay length of $M_1$, a second output fiber has a delay length of $M_2$, and so on for "$M_M$" such output optical fibers 30. This provides for "M" selectable delays. Thus the combination of input and output optical fibers provides for $N \times M$ different delays.

The switch control signals from the control signal generator are coupled to respective control inputs of the control switches of the laser and detector switches. The control signals are applied to activate pairs of respective switches, while disabling the remainder. This action turns on and off the bias potential applied to each laser, and control the DC bias voltage applied to each photodiode. The RF input signal applied to the laser modulates the laser current and hence the output light signal provided by the the laser. Controlling the bias voltage turns each photodiode on and off, and allows the photodiodes to demodulate the modulated laser output signal processed thereby.

The switching apparatus may further comprise an amplifier coupled to the signal output of the output signal network: A plurality of cascaded devices may be provided wherein a signal output of a preceding device is coupled to the signal input of a subsequent device. In the event that an amplifier is used, the signal output of a preceding device is derived from the amplifier and is coupled to the signal input of the subsequent device.

The present invention provides for the use of laser switches and photodiode switches independently to interconnect or provide for tree-time-delay beamsteering. The present invention provides the product of the number of interconnection paths. The present invention also provides for improved insertion loss while increasing the number of delay paths. This reduced insertion loss is very important for RF signals. For true-time-delay beamsteering, this lessens the number of cascaded stages needed to achieve a given number of delays when switches are provided by either laser or photodiode switches alone.

The present invention uses optoelectronic switching devices interconnected by optical media having different lengths and the passive multiport optical coupler to form a multibit true-time-delay beamsteerer for beamsteering of phased array antennas. The present invention combines two types of optoelectronic devices, lasers and photodiodes, used as switches, by way of the interconnected passive optical network comprising the optical fibers and the optical coupler. Accordingly, the present invention provides for the product of the number of different delay path lengths or interconnections when compared to a devices made up of only one type of switch (i.e. laser or photodiode). For a true-time-delay beamsteering application, this means that more bits of beamsteering may be obtained for the same amount of signal loss. The present invention optimally utilizes the two types of switches in combination to achieve a performance level that is not achieved by using single switching devices alone.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which the sole figure of the drawing illustrates an embodiment of an optoelectronic switch in accordance with the principles of the present invention.

DETAILED DESCRIPTION

Referring to the drawing figures, it illustrates an embodiment of optoelectronic switching apparatus 10 in accordance with the principles of the present invention. The optoelectronic switching apparatus 10 may be employed as a multibit beamsteering switch, for example. In general, the optoelectronic switching apparatus 10 is comprised of an input signal network 13, a laser transmitter section 11, a light receiver section 12, an interconnected passive optical network 25 comprising an optical coupler 15 and a plurality of input and output optical coupling means 20, 30 that interconnects the transmitter section 11 and the receiver section 12, an output signal network 17, and a control signal generator 18.

The input signal network 13 has a signal input and a plurality of signal outputs, and is adapted to distribute an applied input signal, such as a radio frequency (RF) signal, for example, from its signal input to each of its signal outputs. The laser transmitter section 11 is comprised of a plurality of laser switches 14 that each comprise a laser 14a having an RF signal input coupled to a selected signal output of the input signal network 13, and a switch 14b coupled to a bias voltage source (V) that has a control signal input that is coupled between the control signal generator 18 and the laser 14a. Switch control signals 22 are coupled between the control signal generator 18 and the respective switches 14b of the transmitter section 11. The RF input signal applied to the switching apparatus 10 is processed by the input signal network 13 and is distributed from the respective signal outputs thereof to respective RF signal inputs of the plurality of laser switches 14. Depending upon the type of input signal network 13 that is employed, it may include a plurality of RF switches (not shown) that selectively control the distribution of the RF input signal to the respective laser switches 14 using control signals 21 provided by the control signal generator 18 along the (dashed) control line 21.

The light receiver section 12 comprises a plurality of photodetector or photodiode switches 16 that are generally arranged in a manner similar to the laser switches 14. Each photodiode switch 16 comprises a photodiode detector 16a having a signal input and a signal output, and a switch 16b having a control signal input coupled between the control signal generator 18 and the photodiode detector 16a. Switch control signals 24 are coupled between the control signal generator 18 and the respective switches 16b of the light receiver section 12. The output signal network 17 has a plurality of signal inputs that are respectively coupled to each photodetector 16a of the plurality of photodiode switches 16 and a signal output. The plurality of signal inputs of the output signal network 17 are coupled to respective signal outputs of the plurality of photodiode switches 16. The output signal network 17 is adapted to selectively couple signals, such as the radio frequency (RF) signals, for example, applied to respective ones of its signal inputs to its signal output.

The switch control signals 22 derived from the control signal generator 18 are coupled to respective control inputs of the plurality of laser switches 14. The applied control signals 22 are adapted to operably switch each respective switch 14b in response thereto which opens or closes a path for a bias potential (V) applied to the laser 14a. The RF input signal is applied-to the laser 14a and is adapted to modulate the laser current and hence the output signal provided by the the laser 14a. The switching control signals 24 derived from the control signal generator 18 are coupled to respective control inputs of the plurality of switches 16b and are adapted to operably switch each respective switch 16b in response thereto. The control signals 24 control a DC bias voltage (V) applied to the photodiode 16a. This action turns the respective photodiodes 16a on and off, and allows (or does not allow) the photodiodes 16a to demodulate the modulated signal processed thereby.

The optical coupler 15, which may comprise a star network, for example, includes a plurality of signal inputs interconnected in parallel to a plurality of signal outputs. The plurality of signal inputs of the optical coupler 15 are coupled to respective signal outputs of the plurality of laser switches 14 by means of individual input optical coupling means 20, such as input optical fibers 20, or other optical media. Such other optical media include dielectric material, semiconductor material, or a polymer, such as polyimide, for example. The plurality of signal outputs of the optical coupler 15 are coupled to respective signal inputs of the plurality of photodiode switches 16 by means of individual output optical fibers 30, for example, in a manner similar to the input optical coupling means 20.

Each respective input optical coupling means 20 or input optical fiber 20 has a predetermined delay length, illustrated by loops shown in the drawing. For example, a first input optical fiber 20-1 is selected to have a delay length of $N_1$, a second input fiber 20-2 has a delay length of $N_2$, a third input fiber 20-3 has a delay length of $N_3$, a fourth input fiber 20-4 has a delay length of $N_4$, and so on for "$N_N$" such optical fibers 20. This provides for "N" selectable delays. Each respective output optical coupling means 30 or optical fiber 30 also has a predetermined delay length. For example, a first output optical fiber 30-1 is selected to have a delay length of $M_1$, a second output fiber 30-2 has a delay length of $M_2$, a third output fiber 30-3 has a delay length of $M_3$, a fourth output fiber 30-4 has a delay length of $M_4$, and so on for "$M_M$" such output optical fibers 30. This provides for "M" selectable delays. Thus the combination of input and output optical fibers 20, 30 provides for $N \times M$ different delays.

The optoelectronic switching apparatus 10 of the present invention uses the laser switches. 14 to modulate laser light in accordance with the applied RF input signal and transmit the light by way of the optical fibers 20, 30, and as a switching device for selectively activating a particular laser 14a. The photodiode switches 16 are used as both light detectors that recover or demodulate the applied input signal, and as switches for allowing the photodiodes 16a to be turned on and off. The laser and photodiode switches 14, 16 employed in the present invention is generally described in detail in the above-cited U.S. Pat. No. 5,109,449, which is incorporated herein by reference in its entirety. The optical coupler 15 (or star coupler) is used to passively interconnect the optical outputs of the laser switches 14 to inputs of the photodiode switches 16. The laser switches 14, photodiode switches 16 and optical coupler 15 are interconnected by the optical fibers 20 so that there is a light path having a controllably selectable delay length disposed between each laser switch 14 and a photodiode switch 16.

The number of interconnections is the product of the number of laser switches 14 and the photodiode switches 16. By switching on a pair of laser and photodiode switches 14, 16, the applied input signal may be connected from the input of the optoelectronic switching apparatus 10 to its output such that a particular delay length is provided. Turning on of the laser switches 14 and photodiode switches 16 is achieved using the switching control signals 22, 24 under control of the control signal generator 18 in a conventional manner. Thus, in a beamsteering application, for example, it should be apparent that by appropriately setting the individual delay lengths of the optical fibers 20, 30, and by employing a plurality of the optoelectronic switching apparatus 10, an applied RF input signal may be selectively delayed to create an energy phase front that is directed (steered) in any desired direction, depending upon the selected delay length of each apparatus 10. This is described in more detail below.

The input and output signal networks 13, 17 are configured for a particular use of the optoelectronic switching apparatus 10. When the optoelectronic switching apparatus 10 is used as a beamsteerer for an active array, for example, the input signal network 13 may comprise RF couplers or switches (not shown), for example. The use of RF switches for this application yields lower insertion loss. The input signal network 13 (couplers or switches) couple RF modulation (for the transmit or receive signal of an active array) to a particular laser switch 14 connected to an input fiber 20 having a desired delay length that is needed to steer or point a particular antenna array element. Likewise the output signal network 17 coupled to the photodiode switches 16 may comprise RF couplers or switches that select the particular photodiode switch 16 connected to an output fiber 30 having a desired delay length. One pair of laser and photodiode switches 14, 16 are selected for a given delay. For photodiode switches 16 that are packaged close together, an RF coupler design technique may be used that ideally provides no coupling loss when several photodiode switches 16 are interconnected using RF signal lines. This is possible since only one photodiode switch 16 is turned on to select a delay and the other photodiode switches 16 provide an open circuit on the connecting RF line. The input (output) switching network 13 (17) is used to connect the signal input (output) to the respective signal ports that are interconnected through the optoelectronic switching apparatus 10. In general, the optoelectronic switching apparatus 10 is unidirectional having input signals routed to any or all signal outputs by way of the laser and photodiode switches 14, 16, optical coupler and optical fibers 20, 30. However, wiring arrangements may be employed to appropriately route signals so that the optoelectronic switching apparatus 10 may be used in a bidirectional manner. In either case, the basic configuration of the optoelectronic switching apparatus 10 may be cascaded with additional optoelectronic switches 10 by providing an optional amplifier 19 (typically required) connected to the signal output of each optoelectronic switching apparatus 10, and then connecting the sets of optoelectronic switching apparatus 10 and amplifiers 19 in series.

Thus a new and improved optoelectronic multibit beamsteering switch has been described. It is to be understood that the above-described embodiment is merely illustrative of some of the many specific embodiments that represent applications of the principles of the present invention. Clearly, numerous and other arrangements may be readily devised by those skilled in the art without departing from the scope of the invention.

What is claimed is:

1. Optoelectronic switching apparatus comprising:
   an input signal network for receiving a modulating input signal;
   a laser transmitter section comprising a plurality of switchable laser switches that are each adapted to receive the modulating input signal and selectably provide a modulated optical output signal in response thereto and in accordance with control signals applied thereto;
   a light receiver section comprising a plurality of photodiode switches that are each adapted to provide a demodulated electrical output signal derived from the modulated optical output signal provided by the laser transmitter section;
   an output signal network coupled to signal outputs of each respective photodiode switch of the light receiver section;
   an interconnected passive optical network comprising an optical coupler and a plurality of input and output optical coupling means that is coupled between the transmitter section and the receiver section, and wherein each of the input and output optical coupling means provides a predetermined optical delay length for optical energy transmitted thereby; and a control signal generator coupled to the plurality of laser switches and the plurality of photodiode switches for providing control signals that are adapted to activate a selected pair of switches to transmit the modulated optical output signal along a path defined by the respective input and output optical coupling means connected to the selected pair of switches, and demodulate the modulated optical output signal, and wherein the demodulated signal has a predetermined delay associated therewith.

2. The optoelectronic switching apparatus of claim 1 wherein the plurality of laser switches each comprise a laser having a signal input coupled to a respective signal output of the input signal network and that is adapted to receive the modulating input signal and provide a modulated optical output signal in response thereto, and a control switch having a control signal input, a bias voltage input adapted to receive a first bias voltage and an output coupled to the laser that is adapted to apply the first bias voltage to the laser in accordance with the control signals applied thereto.

3. The optoelectronic switching apparatus of claim 2 wherein the plurality of photodiode switches each comprise a photodetector having a signal input and a signal output, and a control switch having a control signal input that is adapted to apply a second bias voltage to the photodetector, and which is adapted to provide a demodulated electrical output signal derived from the modulated optical output signal provided by the laser transmitter section.

4. The optoelectronic switching apparatus of claim 3 wherein the interconnected passive optical network comprises an optical coupler and a plurality of input and output optical coupling means that is coupled between the transmitter section and the receiver section, and wherein individual input optical coupling means are optically coupled to respective signal outputs of the plurality of laser switches, and wherein individual output optical coupling means are optically coupled to respective signal inputs of respective ones of the plurality of photodiode switches, and wherein each of the input and output optical coupling means provides a predetermined optical delay length for optical energy transmitted thereby.

5. The optoelectronic switching apparatus of claim 4 wherein the control signal generator is coupled to respective control inputs of the plurality of laser switches and the plurality of photodiode switches for providing control signals that are adapted to activate a selected pair of switches to transmit the modulated optical output signal along a path defined by the respective input and output optical coupling means connected to the selected pair of switches, and demodulate the modulated optical output signal, and wherein the demodulated signal has a predetermined delay associated therewith.

6. The optoelectronic switching apparatus of claim 1 which further comprises an amplifier coupled to the signal output of the output signal network.

7. The optoelectronic switching apparatus of claim 1 which comprises a plurality of cascaded apparatus wherein a signal output of a preceding switching is coupled to the signal input of a subsequent apparatus.

8. Optoelectronic switching apparatus comprising:

an input signal network comprising a signal input that is adapted to receive a modulating input signal, and a plurality of signal outputs;

a laser transmitter section comprising a plurality of laser switches that each comprise a laser having a signal input coupled to a respective signal output of the input signal network and that is adapted to receive the modulating input signal and provide a modulated optical output signal in response thereto, and a control switch having a control signal input, a bias voltage input adapted to receive a first bias voltage and an output coupled to the laser that is adapted to apply the first bias voltage to the laser in accordance with control signals applied thereto;

a light receiver section comprising a plurality of photodiode switches that each comprise a photodetector having a signal input and a signal output, and a control switch having a control signal input that is adapted to apply a second bias voltage to the photodetector, and which is adapted to provide a demodulated electrical output signal derived from the modulated optical output signal provided by the laser transmitter section;

an output signal network having a plurality of signal inputs and a signal output, and wherein individual ones of the plurality of signal inputs are coupled to signal outputs of each respective photodiode switch;

an interconnected passive optical network comprising an optical coupler and a plurality of input and output optical coupling means that is coupled between the transmitter section and the receiver section, and wherein individual input optical coupling means are optically coupled to respective signal outputs of the plurality of laser switches, and wherein individual output optical coupling means are optically coupled to respective signal inputs of respective ones of the plurality of photodiode switches, and wherein each of the input and output optical coupling means provides a predetermined optical delay length for optical energy transmitted thereby; and a control signal generator coupled to respective control inputs of the plurality of laser switches and the plurality of photodiode switches for providing control signals that are adapted to activate a selected pair of switches to transmit the modulated optical output signal along a path defined by the respective input and output optical coupling means connected to the selected pair of switches, and demodulate the modulated optical output signal, and wherein the demodulated signal has a predetermined delay associated therewith.

9. The optoelectronic switching apparatus of claim 8 wherein the optical coupler is optically coupled to the plurality of laser switches and to the plurality of photodiode switches by means of individual optical fibers.

10. The optoelectronic switching apparatus of claim 8 wherein the optical coupler is optically coupled to the plurality of laser switches and to the plurality of photodiode switches by means of a dielectric material.

11. The optoelectronic switching apparatus of claim 8 wherein the optical coupler is optically coupled to the plurality of laser switches and to the plurality of photodiode switches by means of a predetermined polymer.

12. The optoelectronic switching apparatus of claim 11 wherein the predetermined polymer comprises polyimide.

13. The optoelectronic switching apparatus of claim 8 wherein the optical coupler is optically coupled to the plurality of laser switches and to the plurality of photodiode switches by means of a semiconductor material.

14. The optoelectronic switching apparatus of claim 8 which further comprises an amplifier coupled to the signal output of the output signal network.

15. The optoelectronic switching apparatus of claim 8 which comprises a plurality of cascaded apparatus wherein a signal output of a preceding apparatus is coupled to the signal input of a subsequent apparatus.

16. The optoelectronic switching apparatus of claim 14 which comprises a plurality of cascaded switches wherein a signal output of a preceding apparatus derived from the amplifier is coupled to the signal input of a subsequent apparatus.

* * * * *